United States Patent [19]

Kniazzeh

[11] Patent Number: 5,728,252
[45] Date of Patent: Mar. 17, 1998

[54] METHOD AND APPARATUS FOR LAMINATING IMAGE-BEARING MEDIA

[75] Inventor: Alfredo G. Kniazzeh, West Newton, Mass.

[73] Assignee: Polaroid Corporation, Cambridge, Mass.

[21] Appl. No.: 531,232

[22] Filed: Sep. 19, 1995

[51] Int. Cl.$^6$ .................................................. B32B 31/04
[52] U.S. Cl. ................... 156/324; 156/555; 100/93 RP; 100/176; 492/27; 492/56
[58] Field of Search .................. 156/555, 583.1, 156/324; 425/368; 100/93 RP, 155 R, 160, 176; 492/27, 48, 49, 53, 56, 60

[56] References Cited

U.S. PATENT DOCUMENTS

| | | | |
|---|---|---|---|
| 1,619,371 | 3/1927 | Rogers et al. | 492/21 |
| 2,230,289 | 2/1941 | Dodge | 18/59 |
| 2,689,392 | 9/1954 | Robertson | 26/63 |
| 2,947,130 | 8/1960 | Everett | 56/1 |
| 2,960,749 | 11/1960 | Robertson et al. | 26/63 |
| 2,996,784 | 8/1961 | Young | 26/63 |
| 3,012,301 | 12/1961 | Rogers et al. | 26/63 |
| 3,097,590 | 7/1963 | Justus | 100/155 |
| 3,308,519 | 3/1967 | Westgate | 26/63 |
| 3,395,636 | 8/1968 | Hess | 100/93 |
| 3,451,112 | 6/1969 | Karmell et al. | 29/130 |
| 3,604,087 | 9/1971 | Beck | 29/127 |
| 3,665,572 | 5/1972 | Robertson | 29/116 |
| 3,678,846 | 7/1972 | Bjorkegren | 100/155 R |
| 3,783,481 | 1/1974 | Gallant | 29/116 AD |
| 4,192,229 | 3/1980 | Tsunoi et al. | 100/158 R |
| 4,305,191 | 12/1981 | Enomoto | 29/116 AD |
| 4,449,278 | 5/1984 | Geyken et al. | 492/56 |
| 4,682,878 | 7/1987 | Takizawa et al. | 355/3 FU |
| 4,800,742 | 1/1989 | Feldmann et al. | 72/247 |
| 4,856,313 | 8/1989 | Miura et al. | 72/234 |
| 4,860,416 | 8/1989 | Masui et al. | 29/116.2 |
| 4,870,731 | 10/1989 | Yano | 29/116.1 |
| 4,930,202 | 6/1990 | Yano | 492/27 X |
| 4,943,831 | 7/1990 | Geraets et al. | 355/290 |
| 4,998,333 | 3/1991 | Skyttä | 29/130 |
| 5,130,754 | 7/1992 | Hishikawa | 355/282 |
| 5,195,430 | 3/1993 | Rise | 100/168 |
| 5,253,026 | 10/1993 | Tamary | 355/289 |
| 5,319,430 | 6/1994 | DeBolt et al. | 355/290 |
| 5,356,507 | 10/1994 | Wojtanowitsch et al. | 156/555 |
| 5,411,444 | 5/1995 | Nakamura | 474/148 |

FOREIGN PATENT DOCUMENTS

WO88/04237  6/1988  WIPO .
WO92/09930  6/1992  WIPO .

OTHER PUBLICATIONS

"Tractive Rolling of Tyred Cylinders," D. Nowell and D.A. Hills, *International Journal of Mechanical Science*, vol. 30, 1988, pp. 945–957.

"An Elastic Strip in Plane Rolling Contact," R. H. Bentall and K.L. Johnson, *International Journal of Mechanical Science*, vol. 10, 1968, pp. 637–663.

*Primary Examiner*—James Sells
*Attorney, Agent, or Firm*—Leslie Payne

[57] ABSTRACT

A laminating roll for laminating a layer of protective coating to an image-bearing layer, has a generally cylindrical metallic core and a generally cylindrical compliant and resilient covering surrounding the core. The core and covering both having positive crowns such that the diameter of the outer surfaces of the core and covering measured at central portions thereof are respectively greater than the diameters measured at end portions thereof. The differences between the diameters of the core at central and end portions of the core is greater than that of the covering. The thickness of the covering increases from the center to the ends of the roll.

26 Claims, 2 Drawing Sheets

METHOD AND APPARATUS FOR LAMINATING IMAGE-BEARING MEDIA

BACKGROUND OF THE INVENTION

The present invention generally relates to laminating apparatus and methods, and more particularly to methods and apparatus for laminating a protective cover layer or sheet to an image-bearing element which may, for example, include a backing or substrate layer and a carbon layer. Although the invention is particularly suited to laminating image-bearing media, the invention need not be limited thereto. In its preferred form, the present invention is particularly suitable to laminating media on which thermal imaging has been produced. For a more detailed description of the image-bearing medium, thermal imaging and the relevant laminating methods and apparatus, reference may be had to International patent application No. PCT/U.S. Ser. No. 87/03249 (Publication No. WO 88/04237—Etzel); PCT U.S. Ser. No. 91/08345 (Publication No. WO 92/09930—Fehervari et al); and pending U.S. application Ser. Nos. 08/065,345, U.S. Pat. No. 5,501,940, Bloom et at; and 08/240,854—Gove et at. and filed May 10, 1994 U.S. Pat. No. 5,582,669.

In order to protect the image formed on an image-bearing medium and to preserve the integrity of the image against defects, it is advantageous to apply a protective coating typically in the form of a cover sheet to the image-bearing medium. This is accomplished through a lamination process typically carried out by upper and lower laminating rolls that receive the image-bearing medium and the protective cover sheet in the nip formed between the rolls. The lower roll is typically a rigid roll, such as a steel roll while the upper roll is a rubber-covered roll having a hard core, such as made from steel. Due to the laminating pressure on the rubber covered roll at the nip during a laminating operation, the rubber covering of the upper roll will compress and deform thus causing the peripheral speed of the upper roll to change or decrease relative to the lower roll. The fractional difference in the peripheral speed is known as creep ratio. This non-matching of the peripheral speed of the rolls and the loading of the rolls will cause shear traction at the nip. This in turn can cause ripple and other defects in the laminated product and consequently shear distortions in the image formed on the medium. The non-uniform normal traction in turn will produce non-uniform and thus less highly desirable laminations; as compared to what can otherwise be desired.

Heretofore, to solve the above noted problems of shear traction and non-uniform normal traction on the quality of image, it has been proposed to crown the core and rubber covering of the lower roll to the same degree while maintaining the thickness of the rubber uniform from end to end of the roll. Another proposal has been to crown just the rubber covering. In this regard, the crown in this application is defined as the difference in the radial dimension or diameter of the roll when measured at the center as compared to the end of the roll. The above attempts have not solved the above-noted problems. Other attempts have resorted to techniques for loading the rolls in a certain way, however while they have reduced shear traction they have not achieved uniform normal traction.

SUMMARY OF THE INVENTION

According to the present invention, there is provided a laminating roll for laminating a layer of protective coating to an image-bearing layer. The roll comprises, in combination, a generally cylindrical rigid core, and a generally cylindrical and incompressible or nearly incompressible compliant and resilient covering surrounding the core. The core and covering both having positive crowns such that the diameter of the outer surfaces of the core and covering measured at central portions thereof are respectively greater than the diameters measured at end portions thereof, and wherein the differences between the diameters of the core at central and end portions of the core is greater than that of the covering.

In an illustrated embodiment, the laminating roll has the diameter of the core and the covering gradually diminishing from central portions to end portions thereof. In another illustrated embodiment, the diameters gradually diminish along various curves including parabolic and cosine curves.

In another illustrated embodiment, the laminating roll has a transverse axis midway between the opposite ends thereof, and wherein the covering of the roll has a surface line extending in a radial plane of the roll and being symmetrical about the transverse axis.

In an illustrated embodiment, there is provided a laminating roll wherein the covering has a thickness at the central portion thereof less than the thickness at the end thereof.

In another illustrated embodiment, there is provided a machine for laminating a layer to an image-bearing layer, the machine having a pair of laminating rolls for receiving the layers in a nip therebetween, and wherein one of the rolls has a core and an incompressible or nearly incompressible compliant and resilient outer covering. According to the present invention, there is provided a laminating roll for laminating a layer of protective coating to an image-bearing layer. The roll comprises, in combination, a generally cylindrical metallic or rigid core, and a generally cylindrical incompressible or nearly incompressible compliant and resilient covering surrounding the core. The core and covering both having positive crowns, such that the diameter of the outer surfaces of the core and covering measured at central portions thereof are respectively greater than the diameters measured at end portions thereof, and wherein the differences between the diameters of the core at central and end portions of the core is greater than that of the covering. In an illustrated embodiment, the laminating roll has the diameter of the core and the covering gradually diminishing from central portions to end portions thereof. In another illustrated embodiment, the diameters gradually diminish along various curves including parabolic and cosine curves.

In another illustrated embodiment, there is provided a method of obtaining substantially uniform traction on the layers across a length of the rolls comprising the step of: using as said one roll a roll whose core and covering each have a positive crown in the central portions thereof and with the crown of the core being greater than the crown of the covering.

In still another embodiment of the present invention, there is provided a laminating roll to be used as the upper roll of a pair of laminating nip rolls with a rigid core having a greater crown than its compressible covering. In addition, the covering in the preferred form has a longitudinal surface outline in the form of a parabolic or cosine curve symmetrical about the center midway between the opposite ends of the roll. Additionally the covering has a greater thickness at the ends than at the center thereof.

Accordingly, it is an object of the present invention to provide methods and apparatus for laminating image-bearing media and the use of nip rolls that will provide substantially uniform normal traction while substantially reducing if not eliminating shear traction so as to obtain uniform lamination without shear distortion. Included herein is the provision of such methods and apparatus that will preserve the integrity of the image formed on the image media.

A further object of the present invention is to provide a novel and improved roll for use in laminating image-bearing media. Included herein is the provision of a novel and improved combination of nip rolls for laminating image-bearing media.

In still another embodiment, provision is made for a machine for laminating a layer to an image-bearing layer. The machine includes a pair of upper and lower laminating rolls for receiving the layers in a nip therebetween. The lower roll has a rigid core and an incompressible compliant and resilient outer covering. The improvement includes positive crowns formed on both the outer surface of the core and covering of the lower roll, such that the diameters of the core and covering diminish from a central portion to opposite ends of the core and covering and with the difference of the diameters measured between the central portion and opposite ends of the core being greater than that of the covering.

The above and other objects and advantages of the present invention will become apparent from the following more detailed description when taken in conjunction with the attached drawings in which like parts are designated by like reference numerals throughout the several views.

DETAILED DESCRIPTION

Figure 1:
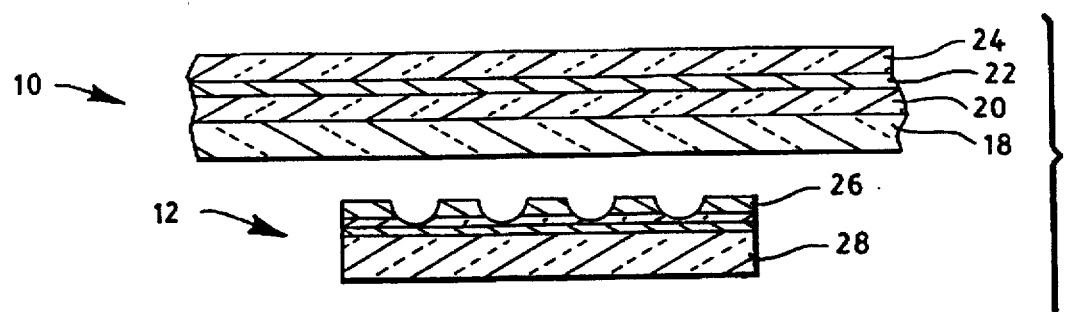
FIG. 1 is a diagrammatic, cross-sectional, side elevational view of a web and an image carrying medium prior to lamination.
Figure 2:
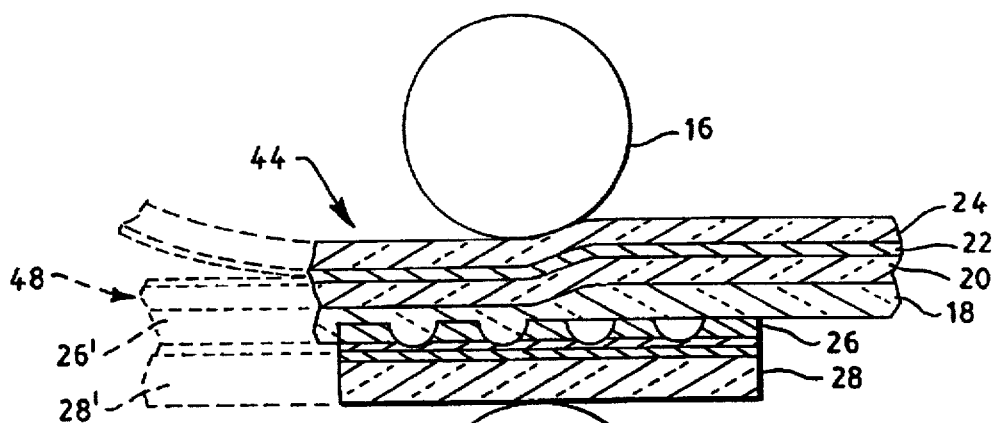
FIG. 2 is a diagrammatic cross-sectional side elevational view of the web and the image carrying medium of FIG. 1 during lamination.

Referring now to the drawings in detail, FIG. 1 shows one particular web 10 carrying a protective thermal overcoating material, and an image-carrying medium 12 which may be laminated together as shown in FIG. 2 with the use of a pair of lower and upper pressure applying laminating rolls 14, 16 made in accordance with the present invention. The web 10 includes an adhesive layer 18, durable layer 20, a release layer 22, and a support layer 24. The image-carrying medium 12 includes a binary image surface 26 formed on a substrate 28. The protective overcoat which is to be thermally transferred to the image carrying medium during lamination includes the durable layer 20, the adhesive layer 18, and a part of the release layer 22. The support layer 24 and a portion of the release layer 22 will be separated and removed, following lamination, from the protected laminated image-carrying medium. A more detailed description of the web 10 and image-carrying medium 12 in sheet form may be obtained by reference to the above-identified U.S. application Ser. No. 08/240,854 assigned to the assignee of the present invention and whose disclosure is incorporated by reference herein as part hereof. Although the above-described web and image medium have been disclosed it should be understood that the present invention is not limited thereto, but rather is applicable to other layers or sheets to be laminated to each other.

Figure 3:
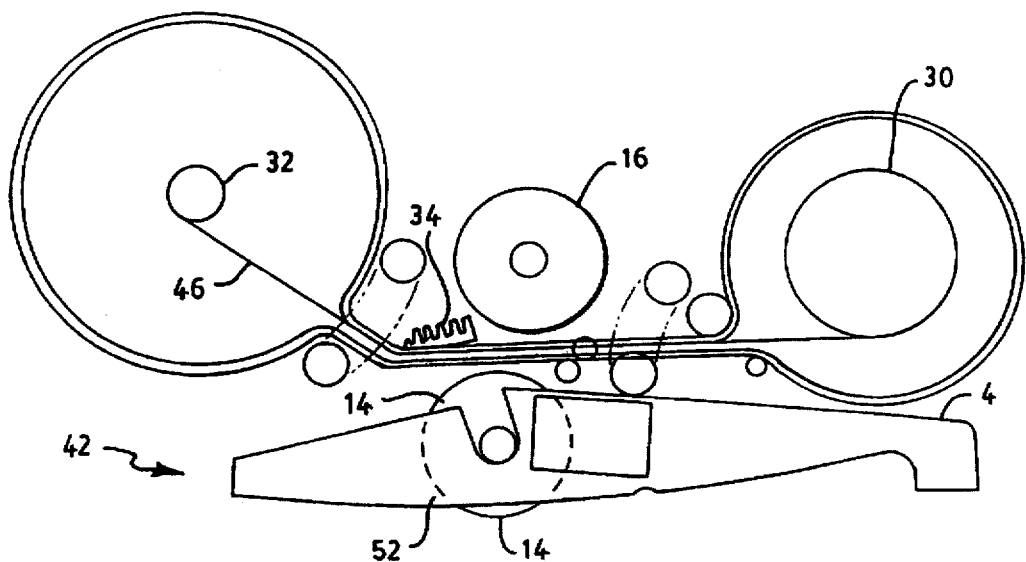
FIG. 3 is a diagrammatic side view of laminating apparatus in one mode of operation when its rolls are spaced apart and lamination is not occurring, the apparatus being of the type which may incorporate the rolls of the present invention.
Figure 4:
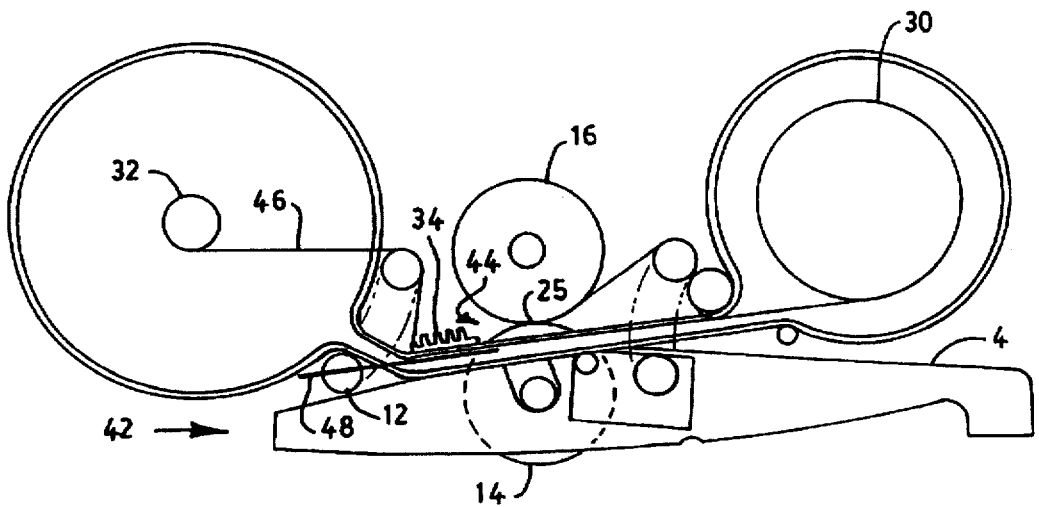
FIG. 4 is a diagrammatic side view of the laminating apparatus of FIG. 3 shown in another mode of operation with the rolls in close operative position while lamination is occurring.

One type of laminating apparatus in which the present invention may be incorporated is shown in FIGS. 3 and 4 which, by way of example only, may produce protected laminated image carrying media having different widths, e.g. 18 and 30 inches for medical or graphic arts pre-press purposes. In one specific embodiment, a continuous 19-inch wide web 10 spans between a supply roller 30 and a driven take-up roller 32. The width of the web 10 is wider than the width of the image-carrying medium to be laminated for ensuring its registration with the image-carrying medium 12. In this embodiment, the web width is set at 19 inches which is wider than for instance the image-carrying medium 12 which is typically supplied as a 18 inch sheet. The image-carrying medium can be forwarded to the nip of the laminating rollers in a variety of ways and in this embodiment is sent from a keeper tray (not shown) which is described in commonly-assigned patent application U.S. patent application Ser. No. 08/240,854. In this embodiment, the laminating roller assembly includes the upper roller 16 which is positively driven and heated, and the lower roller 14 which is cooled for purposes described in the above-noted patent application and not forming part of the present application. The upper roller 16 is, however, crowned in a manner consistent with the teachings of the present invention so as to provide for the substantial reduction or elimination of shear traction on the image-carrying medium as well as provide for substantially uniform normal traction along the axial extent of the nip width for effecting lamination in a manner without disrupting the images on the image-carrying sheet. A delaminating or strip bar 34 is located downstream of the nip 40 defined by the pair of lower and upper laminating rollers 14, 16 for assisting in the delamination of the remaining portion 37 of the web from the protective layer laminated onto the image surface 26. A lower roll assembly 42 is provided which includes the lower roller 14 which in this embodiment is cooled for the reasons described in the last noted application. The lower roll assembly 42 moves to a first, lowered position as shown in FIG. 3 when lamination is not occurring. When lamination is occurring, the lower roll assembly 42 is moved to a second, raised position as shown in FIG. 4; whereby the heated upper and the cooled lower rolls are in pressure applying relationship with each other. The web 10 can be pre-wrapped for pre-heating along the hot roller 16, and the image-carrying medium 12, can be pre-wrapped along cold roller 14 for juxtaposition with the web 10. The juxtaposed web 10 and image-carrying medium 12 are fed into the nip 40 under compression sufficient to promote bonding of the two. During bonding at the nip, heat energy is ideally uniformly transferred from the heated roller 16 to the web 10 at a temperature sufficient to soften the adhesive layer 18, i.e. at the glass transition temperature of the adhesive layer. Typically, the juxtaposed web 10 and image-carrying medium 12 are uninterruptedly fed through the nip at a constant pre-established rate (such as 0.5 to 2 in./sec), where the juxtaposed sheets are heated and compressed so that the web 10 is bonded to the image-carrying medium 12.

Downstream of the nip 40, the discard or throwaway layer 46, composed of the support layer 24 and part of the release layer 22 is separated from the durable layer 20 which remains laminated via adhesive layer 18 to the image-carrying medium 12. In the particular embodiment being described, the separation of the discard layer 46 from the bonded image carrying medium 44 is facilitated by the strip bar 34. The discard layer 46 is wound onto take-up roller 32 after separation from the protected laminated image-carrying medium 44. Since the discard layer 46 is thinner and accordingly more flexible than the protected laminated image-carrying medium 12, the sharp bending of the throwaway layer 46 at the strip bar 34 causes it to mechanically peel away from the protected laminated image-carrying medium 44, resulting in the finished product, i.e. the protected laminated image-carrying medium 44 which in one specific form is composed of the polyester substrate 28, the binary image surface 26, and the protective overcoat which incorporates the adhesive layer 18, the durable layer 20 and part of the release layer 22.

Figure 5:
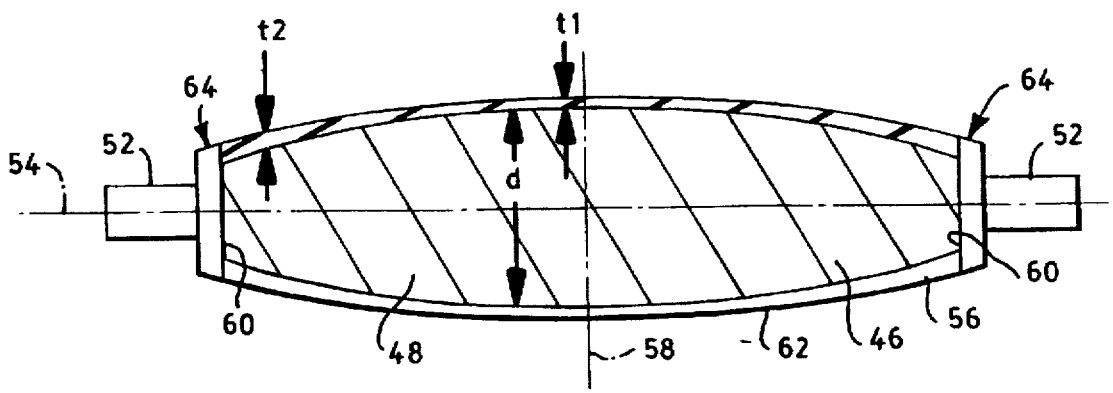
FIG. 5 is one preferred embodiment of a roll shown partially in cross-section, in accordance with the present invention and which is incorporated as the lower laminating roll in the apparatus of FIGS. 3 and 4; the outer surface shapes of the core and cover of the roll being exaggerated to facilitate understanding.

In accordance with the present invention an improved upper laminating roll 16 is incorporated in the apparatus of FIGS. 3 and 4. In one preferred embodiment of the invention shown in FIG. 5, roll 16 has a rigid core 48 made from suitable material such as steel, and an incompressible or nearly incompressible compliant and resilient cover 50 enclosing the core made from robber or any suitable incompressible or nearly incompressible compliant and resilient material. As used in this specification and claims and as understood in the art an incompressible and a nearly incompressible compliant material has a Poisson ratio of about 0.4 or greater. Core 48 is provided with opposite end shafts 52 aligned with the longitudinal axis 54 of the core and roll for mounting the roll in suitable bearings for rotation about axis 54. The outer surface 56 of the core 48 is crowned and extends longitudinally along a curve, preferably a parabolic or cosine curve, with the transverse dimension or diameter "d" of the core gradually decreasing from a maximum dimension at the center or transverse axis 58 to a minimum dimension at the opposite ends 64. Similarly the outer surface 62 of the cover 50, respectively, is crowned and also extends longitudinally along a curve, preferably a parabolic or cosine curve, with the transverse dimension or diameter of the cover decreasing gradually from a maximum at the center or midplane axis 58 to the opposite ends 64. The outer surfaces 56 and 62 of the core 48 and cover 50, respectively, are symmetrical about the midplane 58 which as noted extends transversely through the center of the core and cover equidistant from the opposite end shafts 52, 60. However, in accordance with the present invention the crown of the core 48 is greater than the crown of the covering. That is to say that the difference between the radial or transverse dimension of the core when measured at the midplane 58 and at the end 60 is greater than that of the cover 50.

Additionally in accordance with the present invention, the thickness of the cover 50 gradually increases from a minimum thickness at the transverse center axis 58 to the opposite ends 64 so that, for example, the thickness at "t1" is less than the thickness at "t2" and smallest at the midplane 58. It should be understood that the longitudinal surface shapes of the core 48 and cover 50 have been exaggerated in FIG. 5 as have been the crowns of these surfaces. To put these in proper perspective, one example of a roll 16 of the present invention may have a length of 31 in., a maximum core diameter at the center 58 of 4.000 in. and a minimum diameter of 3.9915 in. at end 60. The corresponding diameter dimensions of the cover 50 could be 4.0160 in. and 4.0094 in. Moreover the thickness of the cover 50 would vary from 0.0080 in. at the center 58 to 0.0132 in. at end 64. These dimensions will vary depending on the materials of the core 48 and cover 50, the loading and consequent bending of the nip rolls 14, 16 in actual use and the width of the nip between the rolls 14, 16 measured in the direction of travel of the layers through the nip. In accordance with the present invention the optimum roll 16 has a monotonically increasing nip width, cover thickness, and indentation as one moves from the center 58 to the ends 64. In addition the crown of the surface 56 of the cover 50 is about twice the crown of the surface 47 of core 48. The "indentation" referred to above is the distance moved together by the centers of the rolls 14, 16 after their surfaces make contact.

By virtue of the above considerations, there is provided an improved laminating roll system in which there is achieved a significant reduction or elimination of the shear traction and the achievement of substantially uniform normal traction which compensates for the reduction of the peripheral velocity of the rubber roll relative to the rigid roll that would otherwise cause distortions of the image-bearing medium. While the foregoing considerations hold true for the use of any incompressible compliant material like rubber, the principles of the invention also apply to the use of different compliant materials with Poisson's ratio less than 0.5 but greater than about 0.4 so long as the core and the coverings have differential crowning and consequently tapered covering thickness so as to compensate for the creep ratio by varying the compliant roll radius.

In this regard, it will be understood that a crowned rubber roller will have a peripheral speed $V_1$ which is proportional to its radius $R_1$ and will vary along the roll according to the crowning. However, the speed of the rubber at the nip must be uniform at $V_2$, the uniform speed of the rigid backing roll of radius $R_2$ (provided there is no slip of the media on the rigid roll and the shear distortion of the hot media is negligible). As noted, because $V_1$ is nonuniform due to crowning, the creep ratio will be nonuniform and this generates shear tractions. In accordance with this invention, the crown roller is shaped so as to minimize or greatly reduce the shear tractions and provide the uniform lamination quality by applying generally uniform normal traction. The elastomeric covering will have a crown which exceeds that of the core and has a thickness which varies along the length of the roller, such that it becomes progressively thicker towards the opposite ends of the roll. The thickness profile will primarily be a function of the material being used. In all situations where the elastomeric covering is essentially incompressible, however, the thickness monotonically increases as one moves from the center to the ends of the roll. Further, the nip width (as used in the specification and claims the term "nip width" means the distance at the nip between opposed rollers, such as opposed rollers 14 and 16) at the nip will increase monotonically from the center to the ends. It will be appreciated that the nip width is the actual circumferential distance the medium is in contact with the upper roller.

The following rubber-roll characteristics have been found to satisfy zero shear and uniform normal traction and are set forth in the following below. The rubber thickness at center of roll is varied from as noted below, while the normal traction is kept constant at 78.5 pli; while bending is in the range of 0.003 to 0.005". Bending is the difference between the rolls' centerline spacing measured at the midplane and at an end. The friction coefficient is =0.4 and the Poisson ratio is =0.5.

TABLE I

| Dimensions at the center of roller | | | Center-to-end dimensional change normalized by bending | | | | |
|---|---|---|---|---|---|---|---|
| rubber thickness | half width of nip | indentation | elastomer thickness | nip half width | crown | core crown | indentation |
| 0.04" | .125" | .0041" | .936 | 1.389 | .892 | 1.828 | .108 |
| 0.08" | .175" | .0090" | 1.298 | 1.359 | .827 | 2.123 | .173 |
| .12" | .213" | .0146" | 1.544 | 1.312 | .774 | 2.318 | .226 |

If elastic nearly incompressible compliant materials such as material with a Poisson ratio of about 0.40 or greater, different from silicone robber are to be used, one would nevertheless have the crown of the rigid core and the elastic covering differ as noted wherein the crown of the core is greater than that of the covering. The crown arrangement will accommodate bending. Because of the crowning, the radius at the ends of the covering will always be smaller than at the center of the roll, thus the peripheral velocity is lower. However, as noted the covering is thicker at the end than at the center and as such it is being compressed more at the end so it has a relatively higher creep ratio than at the center. The importance of creep ratio is follows. A crowned elastic roll will have peripheral speed $V_1$ which is proportional to its radius R and will vary according to the tapering radius due to its crowning. However, the speed of the elastic at the nip must be uniform at $V_2$, the uniform speed of the backing roll of radius $R_2$. Because $V_1$ is non-uniform due to crowning, the creep ratio is nonuniform and this generates the shear tractions. Only if the nip width and elastomer thickness are varied can a variable creep ratio be achieved while eliminating shear tractions and maintaining uniform normal tractions. The monotonically increasing nip width will cause the creep ratio to increase so that the elastic surface at the nip is caused to move faster in relation to the peripheral speed of the elastic material. This faster motion will compensate for the loss which otherwise would be expected. How one configures the elastomeric material depends on the intrinsic material properties, like coefficient of friction and the Poisson ratio. If the creep ratio is positive or negative, depending on the Poisson ratio, then the thickness will increase or decrease toward the end; respectively.

A still further object of the present invention is to provide novel and improved lamination nip rolls that may be used in a peeler laminator machine of the type disclosed in U.S. application Ser. No. 08/261,159 filed Jun. 17, 1994 entitled "Method and Apparatus for Peeling a Laminate" and whose disclosure is hereby incorporated by reference into the present application as part hereof.

Although the present invention has been disclosed and described in connection with one type of laminating apparatus, it will be understood that the present invention is not limited thereto but may be applied to other laminating or nip roll apparatus. Moreover various adaptations and modifications of the invention although not described herein, will be readily apparent to those of ordinary skill in the art. Therefore the scope of the invention should not be limited to the specific description above and associated drawings but rather as indicated in the appended claims.

What is claimed is:

1. A method for use in a machine for laminating a layer to an image-bearing layer, the machine having a pair of laminating rolls for receiving the layers in a nip therebetween, and wherein one of the rolls has a core and an incompressible or nearly-incompressible compliant and resilient outer covering; the method of obtaining substantially uniform normal traction on the layers across the length of the rolls comprising the step of; using as said one roll a roll whose core and covering each have a positive crown in the central portions thereof and with the crown of the core being greater than the combination of the crown of the covering the core.

2. The method defined in claim 1 wherein said one roll has an outer surface which gradually extends inwardly along a curve from a central transverse plane towards the opposite ends thereof.

3. The method defined in claim 2 wherein said surface is symmetrical about an axis lying in said transverse plane.

4. The method defined in claim 1 further including the step of using a covering whose thickness at the central portion thereof is less than at the end thereof.

5. The method defined in claim 3 further including the step of using a covering whose thickness at the central portion thereof is less than at the end thereof.

6. A laminating roll for laminating a layer of protective coating to an image-bearing layer, the roll comprising in combination a generally cylindrical rigid core and a generally cylindrical incompressible or nearly-incompressible compliant and resilient covering surrounding the core, the core and covering both having positive crowns such that the diameter of the outer surfaces of the core and covering measured at central portions thereof are respectively greater than the diameters measured at end portions thereof, and wherein the differences between the diameters of the core at central and end portions of the core is greater than that of the covering; and the thickness of the covering increasing from the center generally symmetrically towards the ends of the roll while nip width increases from the center to the ends of the roll so as to minimize the shear tractions in the protective coating and in the image bearing material while maintaining a uniform degree of lamination across the length of the roll.

7. The laminating roll defined in claim 6 wherein the diameter of the core and covering gradually diminishes from central portions to end portions thereof.

8. The laminating roll defined in claim 7 wherein said diameters gradually taper along a parabolic curve.

9. The laminating roll defined in claim 7 wherein said diameters gradually diminish along a cosine curve.

10. The laminating roll defined in claim 6 wherein said roll has a transverse axis midway between the opposite ends thereof, and wherein said covering of the roll has a surface line extending in a radial plane of the roll and being symmetrical about said transverse axis.

11. The laminating roll defined in claim 10 wherein said surface line extends along a curve.

12. The laminating roll defined in claim 11 wherein said curve is parabolic.

13. The laminating roll defined in claim 11 wherein said curve is a cosine curve.

14. The laminating roll defined in claim 6 wherein said covering has a thickness at the central portion thereof less than the thickness at the end thereof.

15. The laminating roll defined in claim 7 wherein said covering has a thickness at the central portion thereof less than the thickness at the end thereof.

16. The laminating roll defined in claim 11 wherein said covering has a thickness at the central portion thereof less than the thickness at the end thereof.

17. In a machine for laminating a layer to an image-bearing layer, the machine including a pair of upper and lower rolls, laminating rolls for receiving the layers in a nip therebetween and wherein the lower roll has a hard core and an incompressible and nearly-incompressible compliant flexible and resilient outer covering; the improvement including positive crowns formed on both the outer surface of the core and covering of the upper roll such that the diameters of the core and covering diminish from a central portion to opposite ends of the core and covering and with the difference of the diameters measured between the central portion and opposite ends of the core being greater than that of the combination of the covering and the core.

18. The machine defined in claim 17 wherein said surfaces of said core and covering extend from one end towards the opposite ends thereof along a parabolic curve.

19. The machine defined in claim 17 wherein said surfaces of said core and covering extend from one end towards the opposite end thereof along a cosine curve.

20. The machine defined in claim 17 wherein said outer surfaces of the core and covering extend from one end to the opposite ends of the lower roll along a curve which is symmetrical about an axis extending transversely at center of the roll.

21. The machine defined in claim 17 wherein said covering has a thickness at the central portion thereof less than the thickness at the end thereof.

22. The machine defined in claim 20 wherein said covering has a thickness at the central portion thereof less than the thickness at the end thereof.

23. The machine defined in claim 21 wherein said nip has a width dimension in the direction of travel less at the central portion than the end of the roll.

24. The machine defined in claim 21 wherein the nip has a half-width dimension of 0.125 inches and said covering has a thickness of 0.040 inches at the central portion thereof.

25. The machine defined in claim 24 wherein said covering has a thickness of 0.044 at the end thereof.

26. A laminating roll for laminating a layer of protective coating to an image-bearing layer, the roll comprising in combination a generally cylindrical rigid core and a generally cylindrical and incompressible or nearly-incompressible compliant and resilient covering surrounding the core, the core and covering both having positive crowns such that the diameter of the outer surfaces of the core and covering measured at central portions thereof are respectively greater than the diameters measured at end portions thereof, and wherein the differences between the diameters of the core at central and end portions of the core is greater than that of the covering and the core; and the nip width is slightly narrower at the center of the rolls than at the ends of the rolls.

* * * * *